United States Patent [19]
Gaynor et al.

[11] Patent Number: 5,904,924
[45] Date of Patent: May 18, 1999

[54] GREEN NUTRITIONAL POWDER COMPOSITION

[75] Inventors: Mitchell L. Gaynor, New York; Gerard P. Hickey, Manhasset, both of N.Y.

[73] Assignee: Oncologics, Inc., New York, N.Y.

[21] Appl. No.: 08/964,241

[22] Filed: Nov. 4, 1997

[51] Int. Cl.$^6$ ............................. A61K 35/78; A61K 9/14; A23L 1/30

[52] U.S. Cl. ....................... 424/195.1; 424/489; 426/615; 426/640; 426/648

[58] Field of Search ................................. 424/195.1, 489; 426/615, 640, 648

[56] References Cited

U.S. PATENT DOCUMENTS

| 5,445,839 | 8/1995 | Hagiwara et al. | 426/270 |
| 5,536,509 | 7/1996 | Protti | 426/2 |

*Primary Examiner*—Leon D. Lankford, Jr.
*Assistant Examiner*—Christopher R. Tate
*Attorney, Agent, or Firm*—Schweitzer Cornman & Bondell LLP

[57] ABSTRACT

The new nutritional powder composition of the invention is a blend of natural food and herbal products which is compounded in dry form into a green nutritional powder mixture which is readily soluble in a fluid for ingestion by humans. When digested, the mixture provides users with an energy boost and associated feelings of well being when the mixture is taken as part of a regular regimen to supplement normal nutritional intakes and to supplement any therapeutic processes to which the users may be subject.

1 Claim, No Drawings

GREEN NUTRITIONAL POWDER COMPOSITION

BACKGROUND OF THE INVENTION

The homeopathic medical literature is replete with formulae for curatives and palliatives for every imaginable injury and disease. Over the ages, the widespread adoption and usage of myriad herbal based medicines, salves, potions and tonics have been prescribed by healthcare professionals, nutritionists, and others in many cultures, often with highly beneficial results. The present invention is directed to a composition of natural and herbal products which may be compounded in dry form into a mixture which is readily soluble in a fluid for ingestion by humans. Specifically, the new mixture, when digested, has provided users of the same with an energy boost and associated feelings of well being when the mixture is taken as part of a regular regimen to supplement normal nutritional intakes and to supplement any therapeutic processes to which the users may be subject.

While no therapeutic claims are made in this patent application for the mixture of the present invention, it has been observed that the usage of the mixture of the invention has had beneficial palliative effects on certain terminal cancer patients for whom the mixture has been prescribed as a supplement to traditional chemotherapy and/or radiation therapy.

There has been much written about so-called "designer foods". This term is given to a variety of food groups that are mixed with specific nutritional benefits in mind. The role of phytochemicals (any nutritional substance found in plants) in cancer prevention as well as the risks posed by PCBs and pesticides in our environment is the subject of extensive current research.

It is known that barley grass, oat grass, wheat grass, and alfalfa grass contain many of the most potent antioxidants known called carotenoids. Antioxidants are known prevent damage to DNA by preventing free radical induced mutations in these fundamental regulators of cell growth. Indeed, diets rich in antioxidants have been associated with longevity and with a decreased risk of many types of cancer. Grass juices are thus an important source of natural vegetables, antioxidants and phytochemicals that are often overlooked in the usual American diet. The scientist C. W. Lai noted in the 1970's that an extract of wheat grass had activity in preventing damage to cells from cancer causing chemicals.

Wheat and barley grass extract contains substances effective in fighting allergies and inflammation as well as being potent antioxidants. There is a carcinogen known as malondialdehyde found in the gut after consumption of well cooked meats. Malondialdehyde has been associated with breast tumors and is found in the urine in higher amounts in people at risk for cancer. Malondialdehyde is formed from a process called lipid peroxidation. Green barley leaves have been found to inhibit this process. Barley grass also contains a flavonoid compound which is a powerful antioxidant. Flavonoids, besides being antioxidants, have been used to treat a variety of conditions such as allergies and inflammation. In addition, experimental data showed their antiviral and antitumor effects are accumulating.

Blue-green algae, spirulina, chlorella, kelp and Irish moss are full of natural carotenoids and other important phytochemicals. Quercitin is a phytochemical found in algae which has been found to suppress the growth of cancer cells. Carotenoids (of which Vitamin A and beta carotene are only two) have been associated with a decreased cancer risk. They likely have their effect by inducing enzymes called Phase II enzymes, which detoxify cancer causing chemicals. Enzymes help reactions take place without becoming involved themselves. Phase II enzymes facilitate reactions that break down active carcinogens in the body before they can damage the DNA of cells. These substances are broken down into harmless detoxification products, which are then used in other processes or eliminated form the body. Some foods which contain chemicals that increase our own bodies' detoxifying enzymes are: Broccoli, cabbage, algae, grass juices and antioxidant vitamins.

By weight, algae are the most concentrated source of many nutrients like protein, antioxidants and phytochemicals. Algae by weight have even more carotenoids than carrots. It has been postulated that algae, one of the first life forms to appear on the planet, possess potent antioxidants for protection from ultraviolet radiation. Due to their remarkable detoxification potential, algae are used to clean up oil and other toxic spills. Algae were found to beneficial in treating radiation poisoning in patients involved in the Chernobyl disaster. Algae are destined to be a more important food supplement in the 21st century and in fact are being studied by NASA as a self-contained food source for survival in space. Marine edible algae are well known to be stable against oxidation during storage and after drying. They have been found to contain potent new antioxidants which scientists are continuing to identify. Chlorophyll is the basis of photosynthesis in all plant life. Algae are packed with chlorophyll and related substances called chlorophyllones, both of which are potent antioxidants. They are also the richest non-animal source of vitamin B-12. They are rich in all essential amino acids which have excellent bio-availability due to the lack of cellulose in the cell wall of algae.

Many common dietary herbs have documented chemo-preventative properties as well. Siberian Ginseng, which contains the phytonutrient ginenoside, has been used as a health-promotion vegetable in Oriental nutrition. Ginseng has been found to prevent carcinogen induced cancer in mice. It has also been found to protect against inflammation which is probably important in the nutritional prevention of cancer. In Chinese diets, ginseng is used in chicken-ginseng soup and a slice of ginseng with honey is often taken as a snack. The commonly used herb rosemary has been found to have substances which are powerful antioxidants.

Soybeans contain high levels of four substances with proven anticancer activity; folic acids, glycosides, phytosterol and protease inhibitors. The glycosides are composed of two compounds which are probably critical in cancer prevention: saponins and isoflavonoids. Soybeans contain the highest level of saponins of any plant. Saponins have been found to enhance an important part of the immune system called natural killer cell activity. They have also been found to be toxic to certain cancer cells and decrease the growth of others. Saponins have also been found in experimental laboratory studies to inhibit effects and infectivity of the AIDS virus.

Isoflavones are also known as phytoestrogens. Phytoestrogens are plant hormones, so to speak, that are weaker versions of human estrogens. Their structure enables them to bind to estrogen receptors on the surface of cells. Since estrogens have been linked to breast, colon, ovarian and endometrial cancer, the blocking ability of isoflavones may account for their potency.

The estrogenic activity of phytoestrogens (isoflavones) is about 0.1% of that of the estrogens produced by women. Isoflavones also appear to increase liver production of a protein which bonds to estrogen, thus decreasing the amount of free estrogen in the bloodstream. By these mechanisms, it is thought that isoflavones decrease the risk of estrogen dependent cancer such as those of the breast, ovary and endometrium.

Tofu is one of the most widely eaten forms of soybean in Japan and is rapidly being discovered in America as well. The main phytoestrogen in soy is known as genistein. This compound is also found in high amounts in black beans. This may well account for the reduced rates of breast cancer among Hispanic women. Genistein has been found to significantly reduce the incidence of breast tumors in rats treated with carcinogenic chemicals. Genistein has been found to suppress genes that can promote cancer. Phytoestrogens have also been found in inhibit an enzyme called aromatase which converts to other hormones to estrogens. This modification of estrogen by dietary means is important. In one study, women who ate a diet high in red meat had 30% higher serum levels of estrogen than women who ate mostly vegetables. Other phytoestrogens which are currently being studied are: coumestrol, a powerful plant estrogen found in soybeans, Brussels sprouts and beet; diazdein found in soy, chick peas and pomegranates and rutin found in soy, Brussels sprouts and peanuts.

SUMMARY OF THE INVENTION

The comprehensive food supplement of the present invention contains blue-green algae, organic green juice powders, certain Asian herbs, certain Western herbs, soy isoflavones, essential fatty acids, and cruciferous vegetable extracts combined in a new and original combination to provide a beneficial supplement to ordinary diets.

The new mixture of the present invention is compounded in dry form for dissolving in a fluid such as water or fruit juice and, most advantageously, tomato juice before usage. The mixture of the invention, which has been found to be palliative, includes: high pectin apple fiber, soy lecithin, soy isoflavones, brown rice germ, royal jelly, bee propolis, acerola berry juice powder, Japanese green tea, grape seed extract, grape skin extract, carrot juice, bilberry, flaxseed meal, bee pollen, ginkgo biloba, red clover, burdock root, dandelion, parsley, rose hips, milk thistle, ginger, Siberian ginseng, rosemary, curcumin, garlic, lycopene, grapefruit seed extract, spinach, broccoli, I-carnitine, I-glutamine, I-arginine, spirulina, blue green algae, CGC chlorella broken cell, digitata kelp, Irish moss, barley grass, oat grass, wheat grass, alfalfa grass, n-acetyl cysteine, alpha lipoic acid, thiamine HCL, riboflavin, pyridoxine HCL, niacinamide, pantothenic acid, B-12, biotin, paba, folic acid, choline bitartrate, inositol.

The ingredients of the new nutritional powder composition are natural sources of the following plant phytonutrients: soy isoflavonoids, oligomeric proanthcyanidins, indol-3-carbinol, sulforaphone, fibrous ligands, plant phytosterols, ferulic acid, anthocyanocides, triterpenes, omega 3/6 fatty acids, polyacetylene, quinones, terpenes, cathechins, gallates, quercitin, soluble and insoluble fiber including: pectin, cellulose, hemicellulose, gum, mucilage. This highly esoteric combination, as more specifically described hereinafter, when dissolved in a fluid and ingested, has had unexpected beneficial palliative effects. When digested, the mixture provides users with an energy boost and associated feelings of well being when the mixture is taken as part of a regular regimen to supplement normal nutritional intakes and to supplement any therapeutic processes to which the users may be subject.

DETAILED DESCRIPTION OF THE PRESENT INVENTION

In accordance with the present invention, a beneficial palliative nutritional drink may be formed by combining a 969 gram serving of the following mixture of dried natural and herbal ingredients with approximately 10 to 20 ounces of water:

| 969 Gram Serving Contains: | |
| --- | --- |
| PHYTONUTRIENTS | |
| High Pectin Apple Fiber | 1350 mg. |
| Soy Lecithin | 4250 mg. |
| Brown Rice Germ | 700 mg. |
| Royal Jelly | 0111 mg. |
| Bee Propolis | 2400 mg. |
| Acerola Berry Juice Powder | 230 mg. |
| Grape Skin | 300 mg. |
| Carrot Juice | 500 mg. |
| Flaxseed Meal | 4000 mg. |
| Bee Pollen | 1000 mg. |
| Red Clover | 60 mg. |
| Burdock Root | 60 mg. |
| Dandelion | 60 mg. |
| Parsley | 60 mg. |
| Rose Hips | 60 mg. |
| Ginger | 160 mg. |
| Siberian Ginseng | 60 mg. |
| Rosemary | 60 mg. |
| Curcumin | 60 mg. |
| Grapefruit Seed Extract | 25 mg. |
| Spinach | 100 mg. |
| Broccoli | 100 mg. |
| GUARANTEED POTENCY HERBS and PHYTOCHEMICALS | |
| Grape Seed Extract g.p. (standardized to 95% polyphenols) | 40 mg. |
| Japanese Green Tea g.p. (standardized to 7.5% catechins predominantly as (−) epigallocatechin gallate [EGCG]) | 40 mg. |
| Soy Isoflavones g.p. supplying 12–14 mg. of genistein, genistin, daidzin, daidzein, glycitin and glycitein | 750 mg. |
| Bilberry (European) g.p. (standardized to 25% anthocyanocides) | 20 mg. |
| Ginkgo Biloba g.p. (standardized to 24% gingkoflavoglycosides and 6% terpenes) | 60 mg. |
| Lycopene g.p. | 10 mg. |
| Garlic (odorless) Puregar (1,500 p.p.m. allicin yield) | 250 mg. |
| Milk Thistle g.p. | 120 mg. |
| ALPHA AMINO ACIDS | |
| L-Carnitine | 250 mg. |
| L-Glutamine | 250 mg. |
| L-Arginine | 250 mg. |
| ALGAE (blue and green) | |
| Spirulina | 1300 mg. |
| Blue Green Algae (Klamath Lake) | 1500 mg. |
| CGC Chlorella Broken Cell | 350 mg. |
| Digitata Kelp | 40 mg. |
| Irish Moss | 40 mg. |
| GREEN GRASS JUICE POWDERS | |
| Barley Grass | 1350 mg. |
| Oat Grass | 1350 mg. |
| Wheat Grass | 1350 mg. |
| Alfalfa Grass | 1350 mg. |
| OTHER NUTRIENTS | |
| N-Acetyl-L-Cysteine | 600 mg. |
| Alpha-Lipoic Acid | 100 mg. |

969 Gram Serving Contains:

| B COMPLEX VITAMINS | |
|---|---|
| Thiamine HCl (Vitamin B-1) | 50 mg. |
| Riboflavin (Vitamin B-2) | 50 mg. |
| Pyridoxine HCl (Vitamin B-6) | 50 mg. |
| Niacinamide | 100 mg. |
| Pantothenic Acid | 250 mg. |
| Vitamin B-12 | 250 mcg. |
| PABA (Para-Aminobenzoic Acid) | 50 mg. |
| Biotin | 100 mcg. |
| Folic Acid | 400 mcg. |
| Choline Bitratrate | 100 mg. |
| Inositol | 100 mg. |

The aforementioned dried ingredients are appropriately pulverized and blended into a pourable powder. Unit portions, if desired, may advantageously be prepackaged into individual envelopes for later usage before they are mixed in a fluid selected for the preparation of the new potion of the present invention.

While a mixture formed from all of the aforementioned ingredients has been determined by initial testing to have beneficial palliative effects, it will be understood by those skilled in the art that certain qualitative and quantitative variations in the aforementioned formulation of the nutritional base mixture may be made without deleterious effect on the efficacy of the disclosed mixture. Indeed, by reducing the amount of fluid with which the mixture of dried ingredients is mixed, should it be desired, the nutritional powder composition of the present invention may be prepared as a food paste or spread rather than as a potable solution.

We claim:

1. A green nutritional powder composition comprising phytonutrients, potency herbs, phytochemicals, alpha amino acids, green algae, blue algae, green grass juice powders, and B-complex vitamins, including, by weight, the following:

| PHYTONUTRIENTS | |
|---|---|
| High Pectin Apple Fiber | 1350 mg. |
| Soy Lecithin | 4250 mg. |
| Brown Rice Germ | 700 mg. |
| Royal Jelly | 0111 mg. |
| Bee Propolis | 2400 mg. |
| Acerola Berry Juice Powder | 230 mg. |
| Grape Skin | 300 mg. |
| Carrot Juice | 500 mg. |
| Flaxseed Meal | 4000 mg. |
| Bee Pollen | 1000 mg. |
| Red Clover | 60 mg. |
| Burdock Root | 60 mg. |
| Dandelion | 60 mg. |
| Parsley | 60 mg. |
| Rose Hips | 60 mg. |
| Ginger | 160 mg. |
| Siberian Ginseng | 60 mg. |
| Rosemary | 60 mg. |
| Curcumin | 60 mg. |
| Grapefruit Seed Extract | 25 mg. |
| Spinach | 100 mg. |
| Broccoli | 100 mg. |

| GUARANTEED POTENCY HERBS and PHYTOCHEMICALS | |
|---|---|
| Grape Seed Extract g.p. (standardized to 95% polyphenols) | 40 mg. |
| Japanese Green Tea g.p. (standardized to 7.5% catechins predominantly as (−) epigallocatechin gallate [EGCG]) | 40 mg. |
| Soy Isoflavones g.p. supplying 12–14 mg. of genistein, genistin, daidzin, daidzein, glycitin and glycitein | 750 mg. |
| Bilberry (European) g.p. (standardized to 25% anthocyanocides) | 20 mg. |
| Ginkgo Biloba g.p. (standardized to 24% gingkoflavoglycosides and 6% terpenes) | 60 mg. |
| Lycopene g.p. | 10 mg. |
| Garlic (odorless) Puregar (1,500 p.p.m. allicin yield) | 250 mg. |
| Milk Thistle g.p. | 120 mg. |

| ALPHA AMINO ACIDS | |
|---|---|
| L-Carnitine | 250 mg. |
| L-Glutamine | 250 mg. |
| L-Arginine | 250 mg. |

| ALGAE (blue and green) | |
|---|---|
| Spirulina | 1300 mg. |
| Blue Green Algae (Klamath Lake) | 1500 mg. |
| CGC Chlorella Broken Cell | 350 mg. |
| Digitata Kelp | 40 mg. |
| Irish Moss | 40 mg. |

| GREEN GRASS JUICE POWDERS | |
|---|---|
| Barley Grass | 1350 mg. |
| Oat Grass | 1350 mg. |
| Wheat Grass | 1350 mg. |
| Alfalfa Grass | 1350 mg. |

| OTHER NUTRIENTS | |
|---|---|
| N-Acetyl-L-Cysteine | 600 mg. |
| Alpha-Lipoic Acid | 100 mg. |

| B COMPLEX VITAMINS | |
|---|---|
| Thiamine HCl (Vitamin B-1) | 50 mg. |
| Riboflavin (Vitamin B-2) | 50 mg. |
| Pyridoxine HCl (Vitamin B-6) | 50 mg. |
| Niacinamide | 100 mg. |
| Pantothenic Acid | 250 mg. |
| Vitamin B-12 | 250 mcg. |
| PABA (Para-Aminobenzoic Acid) | 50 mg. |
| Biotin | 100 mcg. |
| Folic Acid | 400 mcg. |
| Choline Bitratrate | 100 mg. |
| Inositol | 100 mg. |

* * * * *